Figure 2:
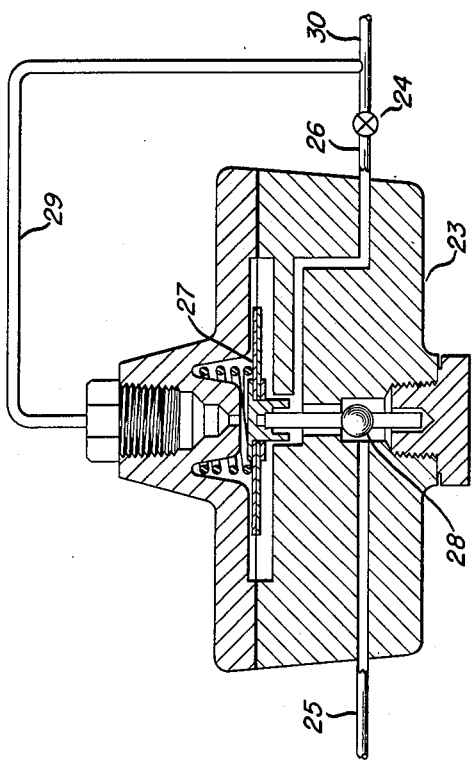

Feb. 11, 1964

J. P. PAGLIS ETAL 3,120,749

GAS CHROMATOGRAPHY

Filed Sept. 30, 1959

INVENTORS:
James P. Paglis
Bruce A. Ritzenthaler

United States Patent Office 3,120,749
Patented Feb. 11, 1964

3,120,749
GAS CHROMATOGRAPHY
James P. Paglis, Highland, Ind., and Bruce A. Ritzenthaler, Chicago, Ill., assignors to Standard Oil Company, Chicago, Ill., a corporation of Indiana
Filed Sept. 30, 1959, Ser. No. 843,399
4 Claims. (Cl. 73—23)

This invention relates to gas chromatography apparatus and more particularly to a gas chromatography apparatus wherein the fluid flow is automatically controlled in order to obtain improved efficiency and accuracy of the analysis.

In gas chromatography a column packed with an appropriate adsorbent is used to separate the various components of a sample containing a mixture of gases. The gas sample is introduced into the column in a carrier gas stream such as clean, dry air, nitrogen, helium, hydrogen, etc. The packing material in the column may be a solid adsorbent such as activated alumina, molecular sieve, charcoal, silica gel, etc., or a column packing material coated with a non-volatile liquid coating by which the gas-sample components are separated. The column is of small diameter having a large ratio of length to diameter, which may vary considerably depending upon the nature of the sample and the necessary degree of separation or resolution.

The gas sample is injected into the carrier gas stream at the entrance to the column, and the sample is then adsorbed by the column packing material. Subsequently, the adsorbed components of the sample gas are eluted from the packing by the carrier gas. These components will be separated according to their partition coefficients, so that the components emerge one by one from the column with the eluting gas stream. As they emerge from the column the components are identified analytically as they pass through a detector such as thermal conductivity cell, a gas density balance or the like. The detector senses the difference in properties of the mixture of carrier gas plus the eluted sample component and the carrier gas which are passed through a measuring side and a reference side, respectively, of the detector. The thermal conductivity cell is generally preferred, although other detectors are often used. If a thermal conductivity cell is used as a detector it may be connected to a recording potentiometer whereby a plot of the bridge output versus time is made. This record then produces a series of peaks in the plot, one for each component of the sample gas separated in the column, which are indicative of the quantity of a given component present in the sample. Any changes in flow conditions while the gas is flowing through the cell will adversely affect the accuracy of the analysis. To obtain an accurate analysis it is of great importance that the rate of flow through a detector cell be maintained at a constant rate because of the variations in cooling rate resulting from fluctuating flow conditions. In the case of small concentrations of a component it is especially important that the degree of diffusion of the sample in the carrier gas be minimized prior to entry into the detector.

In many applications of gas chromatography, especially as applied to process monitoring systems, it is necessary to analyze a sample containing components having a wide range of boiling points, and perhaps containing several components which cannot be effectively separated by a single chromatographic column packing material. The sample may consist of high boiling constituents, necessitating the use of a heated column. In these instances it may be necessary to use multiple columns having different adsorbents, and a heated column may be used in conjunction with the multiple column system.

When using the multiple column apparatus it is generally desirable to at times trap a grouping of components, not effectively separated by one column, in a second column containing a packing which satisfactorily separates the components, and then later effectuate the separation of the components previously "parked" in the second column. The gas stream in traveling through the chromatographic apparatus may flow through one column at a given time, or, serially through multiple columns. Changes in column packing density and the accumulation of heavy end residues in the column may gradually change the flow characteristics in a column over a period of time, and, of course, column switching causes abrupt changes.

Thus, the methods of operating a gas chromatography system will produce varying pressured drops through the system because of varying adsorbents, column lengths, number of columns and heating of the sample gas. As a result, flow control difficulties arise, and it is very difficult, if not impossible, to maintain a constant flow rate of the column effluent gas to the detector during the complete course of analysis. Failure to maintain an established flow rate when switching a column into or out of a system may result in severe base line shifts of the recorded plot of bridge output versus time, and the accuracy of the analysis is affected.

In the prior art, a pressure regulator is placed upstream of the chromatographic columns to control the pressure of the carrier gas, and the flow through each column or column combination is controlled manually with separate needle valves. Thus, any changes in the system downstream from this pressure regulator must be compensated for by valve manipulations. To achieve satisfactory results a skilled chromatographer must devote much time and constant attention to maintaining a good flow control of the gas stream to the detector by manipulating a number of valves when switching columns to compensate for the variances in pressure drop through the chromatography apparatus. Furthermore, column lengths and consequent analysis time must often be increased to permit time between peaks for flow recovery when the flow is temporarily upset by the switching operation. Limitations are also placed upon the column temperature changes permitted in a single columns operation, since flow changes result from column temperature changes causing base line shift.

Accordingly, the present invention reduces the complexity of the chromatographic apparatus and increases the efficiency and accuracy of analysis over that heretofore possible to achieve. The invention provides a method and an apparatus which simplifies the operation of a gas chromatography system wherein column effluent gas pressures tend to vary by permitting the gas flow to be automatically controlled downstream of the column(s) so that a constant rate of gas flow to the detector is maintained. A pressure controller, preferably having a minimum volume path through the controller passages, maintains a constant pressure drop across an orifice through which the gas from the column passes, so that gas at a constant flow rate is passed into the measuring side of a detector regardless of the changes in pressure which may occur upstream of the chromatography columns. The orifice may be either fixed or variable.

Figure 1:
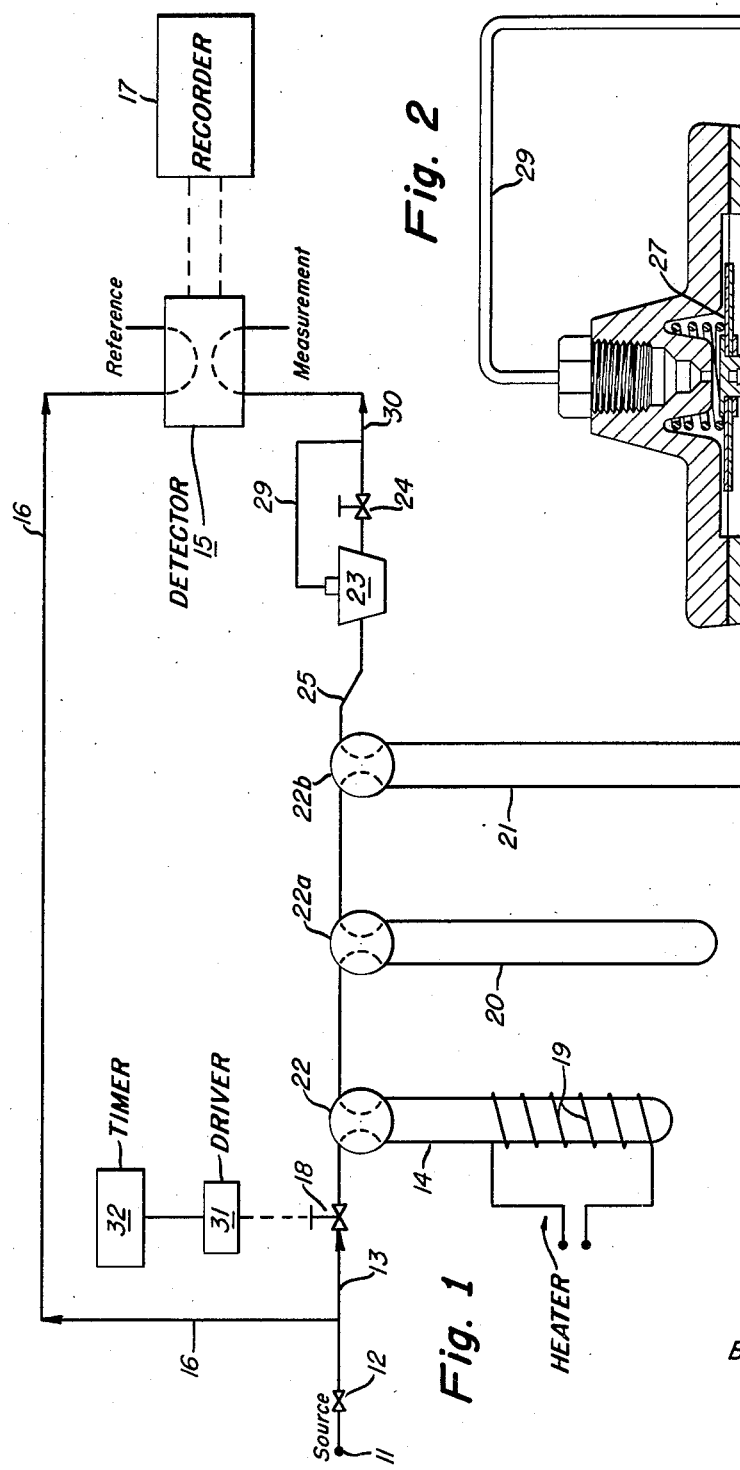

Further understanding of the invention can be obtained from reference to the accompanying drawings and the following description of the preferred embodiment of the apparatus, wherein:

FIGURE 1 is a diagrammatic representation of a gas chromatography apparatus, and FIGURE 2 is a cross-section of a flow controller used to provide a constant flow rate of gas to a detector.

In FIGURE 1, carrier gas from a source 11 is passed through a regulating valve 12 to obtain the desired pressure. The carrier gas stream 13 is introduced into a chromatography column 14 at a controlled rate of flow, typically 60 milliliters per minute, and then passed through the measuring side of a detector 15 which is capable of sensing differences in the properties of a gas flowing through the detector. Another stream of the carrier gas 16 at a controlled rate of flow is passed through the reference side of the detector 15 at a typical flow of 3 milliliters per minute. The detector preferably is a hot filament type thermal conductivity cell, although it may be a thermistor type. Other detectors which may be used are the gas density balance, ionization type or any type which senses the difference in characteristics of gases flowing through the cell.

After balancing the detector output so that the recorder 17 reads zero, a sample of the gas to be analyzed is introduced into the carrier gas stream 13 by way of valve 18 as it enters the column 14. At times a single column may be used, and in some instances the column may be heated by a heater 19 to maintain a desired temperature. In the event of analyzing a gas sample containing a mixture of gases, all of which are not separated by a single column packing material, multiple columns 20 and 21 containing different packing materials may be employed. The exact number of columns and types of column packing contained therein will vary according to the composition of the sample gas.

The combined gas streams enter the column(s) and the sample gas is adsorbed on the column packing, with the components of the sample later desorbed and emerging from the column(s) with the carrier gas according to their partition coefficients. Where there are certain components of the sample gas mixture which are not separated by the packing in column 14 these components may be diverted into another column 20 or column 21 containing a packing suitable for separation or they may be trapped in column 20 and later separated. These columns may be switched in and out of service by manipulating valves 22, 22a and 22b.

Due to the column switching operation described above the flow of column effluent gas into the detector 15 may tend to vary considerably due to differences in pressure drop. In the preferred embodiment a differential pressure controller 23 is provided downstream of the last column used, so that regardless of the gas pressure at the column(s) outlet a constant pressure is maintained downstream of the controller 23. An orifice 24 may be located downstream of the controller 23, and may be of constant or variable size to achieve the desired rate of flow. Preferably, the orifice is a needle valve so that a wide range of adjustment is possible for use in different analyses. The gas stream is discharged through the orifice 24 at a steady rate into the detector 15 which senses the variations in properties of the carrier gas plus component stream. The recorder 17, which is preferably a recording potentiometer, plots the detector output versus time.

When a component of the sample gas passes through the detector a peak is recorded on the chromatographic plot. For the most accurate analysis these peaks must be distinctly separated and well resolved. To obtain maximum resolution it is essential that a minimum volume flow path through the differential pressure controller 23 is maintained. Otherwise, diffusion of the component gas in the carrier gas occurring within a large volume in the controller causes poor resolution of the peaks. For this reason, a controller of the type shown in FIGURE 2 is provided. The effluent gases emerging from the chromatographic column(s) pass through the line 25 into the pressure controller 23 at a variable pressure which is determined by the initial pressure of the carrier gas and the pressure drop through the apparatus. A constant pressure drop and thus a constant flow is maintained across orifice 24 in line 26 by a spring loaded diaphragm 27 which controls the action of the valve plunger 28 to automatically regulate the pressure drop across the orifice 24 in order to obtain a constant flow discharge. The feedback line 29 which may be connected from the downstream side of the orifice 24 in line 30 to the top of the diaphragm 27 samples the pressure in line 30 on the downstream side of orifice 24.

The presence of the controller in the line between the column and the detector tends to increase the volume of the flow path and to provide stagnant areas which increase the likelihood of the sample component diffusing into the carrier gas with a resulting loss of resolution. To minimize this diffusion the volume of the flow path through the controller is kept low and the flow streamlined. This is achieved by maintaining the cross section area of the conduits in the controller substantially the same as that of the line carrying the gas into and out of the controller. Additionally, lines 25, 26 and 30 are kept as short as practical to help minimize the diffusion.

The present invention is of particular significance in adapting gas chromatography to hydrocarbon process monitoring system, particularly wherein the hydrocarbon mixture contains one to twelve carbon atoms per molecule, or mixtures of very close boiling hydrocarbons such as paraffinic hydrocarbon having eight carbon atoms per molecule. In such an instance the sample gas to be analyzed may be automatically injected through a valve 18 of the type described in U.S. Patent No. 2,835,699 of L. V. Sorg and J. C. Lamkin. The valve 18 may be operated by a driver 31 and automatically controlled by a timer 32 in accordance with a preselected program of operation. The sample may contain a wide range of components which require multiple columns with the appropriate adsorbents contained therein, and likely one may be a heated column. As an example, if a reformate stream from an Ultraformer is to be analyzed the sample may contain a large number of hydrocarbon components having a wide range of boiling points. In order to analyze such a stream three chromatographic columns may be used as follows: column 21 may contain silica gel for separating out $C_2$'s and lighter, column 20 may contain safrole on firebrick for separating out $C_3$'s–$C_5$'s, and column 14 may be a heated column containing silicone oil on firebrick for separating out $C_6$'s and heavier. Thus, wide fluctuations in the pressure drop through the apparatus will result as the columns are switched during the analysis. Regardless of the number of columns in series at a given time the present invention provides a constant rate of flow of the gas to the detector, and the chromatographic plot gives peaks with good resolution with no base line shifts as a result of switching columns during the analysis. Column switching may be performed with a component in the detector without causing a perceptible change in the shape of the peak being eluted.

Other advantages gained by using the flow control system of the present invention are greater flexibility of column operation by changing column temperatures during the analysis of wide boiling range materials and improved column efficiencies which result from higher column operating pressures.

As an example of the degree of flow control achieved by this invention, 29 feet of columns were by-passed with a selector valve. The full 30 p.s.i.g. of the carrier gas was imposed upon the controller with no waver of the base line of the chromatographic record. Flow is not interrupted during column switching, and the change in flow is held to a minimum by this invention as shown by the following table:

| Column in system: | Nitrogen flow, cc./min. |
|---|---|
| A (¼″ x 14′ safrole on firebrick) | 60.4 |
| B (¼″ x 9′ $AgNO_3$—glycol on Chromosorb) | 60.6 |
| C (¼″ x 6′ molecular sieve) | 60.4 |
| A+B+C | 60.2 |
| A+B | 60.6 |
| A+C | 60.4 |
| All columns by-passed | 60.5 |

Thus, it is apparent that accurate flow control is achieved automatically by this invention which permits greater accuracy and efficiency, as well as greater flexibility of operation in a gas chromatography apparatus.

Although our invention has been described in its preferred form, it is understood that this description is by way of example only, and numerous changes in the details of operation and construction may be resorted to without departing from the spirit and scope of the invention hereinafter claimed.

What we claim is:

1. An apparatus for the chromatographic analysis of gaseous and vaporous mixtures which apparatus comprises a separation means having an inlet and an outlet, means for conducting a stream of carrier gas into said inlet, means for introducing a gas sample into said carrier gas stream entering said separation means, means for conducting an effluent stream of carrier gas containing an eluted component from said outlet, flow controller means adapted to receive said effluent and discharge said effluent at a substantially constant flow rate, said controller means being provided with a flow path having a maximum cross-sectional area substantially the same as the cross-sectional area of said effluent conducting means, whereby diffusion of said eluted component component in said carrier gas is minimized while said effluent is passing through said controller means, detector means adapted for receiving said discharge and for detecting variations in the properties of said discharge and recorder means for recording said variations.

2. The apparatus of claim 1 wherein said separation means is comprised of multiple chromatographic columns.

3. The apparatus of claim 1 wherein said separation means is comprised of at least one heated chromatographic column.

4. The apparatus of claim 1 wherein said detector is a thermal conductivity cell.

References Cited in the file of this patent

UNITED STATES PATENTS

| | | |
|---|---|---|
| 553,851 | Hardie | Feb. 4, 1896 |
| 1,904,819 | Blodgett | Apr. 18, 1933 |
| 2,757,683 | Biggle | Aug. 7, 1956 |
| 2,826,908 | Skarstrom | Mar. 18, 1958 |
| 2,868,011 | Coggeshall | Jan. 13, 1959 |

OTHER REFERENCES

Keulemans, "Characteristics of Katharometers," Gas Chromatography, 1957, pages 88–93.

Simmons et al., "Two-Stage Gas-Liquid Chromatography," Analytical Chemistry, January 1958, pp. 32–35.

Davis et al., "Double Column Gas Chromatography Analysis of Noncondensable and Light Hydrocarbon Gases by a Combined Gas-Liquid, Gas Solid Chromatograph," Joint Symposium on Progress in Gas Chromatography, New York city meeting, Sept. 8–13, 1957, pp. D–91 to D–95.

Weitzel et al., "Continuous Analysis of Ortho-Parahydrogen Mixtures," The Review of Scientific Instruments, March 1955, pp. 290–292.